(12) United States Patent
Zhong et al.

(10) Patent No.: US 10,998,792 B2
(45) Date of Patent: May 4, 2021

(54) POLYMERIC INDUSTRIAL ELECTRICAL MACHINE

(71) Applicant: ABB Schweiz AG, Baden (CH)

(72) Inventors: Sheng Zhong, Hillsborough, NC (US); Dariusz Bednarowski, Cracow (PL); Colin E. Tschida, Durham, NC (US); Darren Tremelling, Apex, NC (US); Lukasz Malinowski, Cracow (PL)

(73) Assignee: ABB Schweiz AG, Baden (CH)

( * ) Notice: Subject to any disclaimer, the term of this patent is extended or adjusted under 35 U.S.C. 154(b) by 85 days.

(21) Appl. No.: 16/231,110

(22) Filed: Dec. 21, 2018

(65) Prior Publication Data

US 2020/0204032 A1 Jun. 25, 2020

(51) Int. Cl.
*H02K 5/02* (2006.01)
*H02K 5/15* (2006.01)
(Continued)

(52) U.S. Cl.
CPC .................. *H02K 5/02* (2013.01); *H02K 1/18* (2013.01); *H02K 3/46* (2013.01); *H02K 5/15* (2013.01);
(Continued)

(58) Field of Classification Search
CPC ............ H02K 1/18; H02K 3/46; H02K 15/02; H02K 15/12; H02K 5/00–26; B29L 2031/3481; B29C 45/14639
(Continued)

(56) References Cited

U.S. PATENT DOCUMENTS 4,384,226 A * 5/1983 Sato .......................... H02K 5/15
310/216.115
4,631,433 A * 12/1986 Stokes ..................... H02K 5/15
310/43
(Continued)

FOREIGN PATENT DOCUMENTS

CN 202178625 U 3/2012
CN 203660852 U 6/2014
(Continued)

OTHER PUBLICATIONS

Machine Translation, Schaeufele, EP-2204895-A1, Jul. 2010. (Year: 2010).*
(Continued)

*Primary Examiner* — Thomas Truong
(74) *Attorney, Agent, or Firm* — Taft Stettinius & Hollister LLP (57) ABSTRACT

An electrical machine comprises a polymeric housing having a stator band, the polymeric housing formed by a polymeric material and constructed to house components of the electrical machine, structurally support the electrical machine and react torque loads generated by the electrical machine; a stator overmolded into and partially encapsulated by the stator band, the stator including a laminated stator core and a plurality of stator windings; a rotor in magnetic communication with the stator; a first endplate integral with the polymeric housing; and a second endplate, the second endplate being a polymeric endplate, the second endplate including a plurality of ribs and a metallic structure, wherein the electrical machine is constructed as an industrial electrical machine.

20 Claims, 6 Drawing Sheets

(51) Int. Cl.
  *H02K 1/18* (2006.01)
  *H02K 3/46* (2006.01)
  *H02K 5/16* (2006.01)
  *H02K 15/02* (2006.01)
  *H02K 15/12* (2006.01)

(52) U.S. Cl.
  CPC .............. *H02K 5/16* (2013.01); *H02K 15/02* (2013.01); *H02K 15/12* (2013.01)

(58) Field of Classification Search
  USPC ..................................................... 310/89, 90
  See application file for complete search history.

(56) References Cited

U.S. PATENT DOCUMENTS

| | | | |
|---|---|---|---|
| 5,305,163 | A | 4/1994 | Holm |
| 5,334,897 | A | 8/1994 | Ineson et al. |
| 5,404,086 | A | 4/1995 | Takenaka et al. |
| 5,694,268 | A | 12/1997 | Duffield et al. |
| 6,903,475 | B2 | 6/2005 | Ortt et al. |
| 7,036,206 | B2 | 5/2006 | Worden et al. |
| 8,283,827 | B2 | 10/2012 | Jones et al. |
| 2002/0104909 | A1 | 8/2002 | Strutz |
| 2004/0104636 | A1 | 6/2004 | Ortt et al. |
| 2006/0055264 | A1* | 3/2006 | Johnson ............... H02K 5/1677 310/156.23 |
| 2006/0220474 | A1 | 10/2006 | Yoshida |
| 2011/0062806 | A1* | 3/2011 | Ohashi ................. H02K 5/1732 310/55 |
| 2014/0341759 | A1 | 11/2014 | Calico et al. |
| 2015/0108859 | A1* | 4/2015 | Nakazumi ................. H02K 3/32 310/71 |
| 2017/0063190 | A1 | 3/2017 | Hanni et al. |
| 2017/0373545 | A1* | 12/2017 | Zhong ...................... H02K 5/08 |
| 2018/0205283 | A1 | 7/2018 | Mauch et al. |
| 2019/0288576 | A1* | 9/2019 | Oshita ................... F16C 37/007 |

FOREIGN PATENT DOCUMENTS

| | | | |
|---|---|---|---|
| EP | 2204895 A1 * | 7/2010 | .......... H02K 11/215 |
| EP | 2357719 A1 | 8/2011 | |
| WO | 98/15049 A2 | 4/1998 | |
| WO | 2010135922 A1 | 12/2010 | |
| WO | 2018/005348 A1 | 1/2018 | |

OTHER PUBLICATIONS

Nidec Corporation, "Resin-packed motors," Copyright Nidec Corporation 1995-2014. Available: http://www.nidec.com/en-Global/technology/story/resin_pack_motor?prt=1 (3 pages).

European Patent Office, Extended European Search Report issued in corresponding European application No. 19217508.1, dated Aug. 13, 2020, 13 pages.

* cited by examiner

POLYMERIC INDUSTRIAL ELECTRICAL MACHINE

TECHNICAL FIELD

The present application relates generally to electrical machines and more particularly, but not exclusively, to a polymeric industrial electrical machine.

BACKGROUND

Electrical machines, such as motors, generators and motor/generators, remain an area of interest. Some existing electrical machines have various shortcomings, drawbacks and disadvantages relative to certain applications. For example, in some electrical machine configurations, the ability to withstand washdown procedures, e.g., in the food and beverage industry, without corrosion or contamination may require expensive stainless steel housings. Accordingly, there remains a need for further contributions in this area of technology.

SUMMARY

Embodiments of the present invention include unique polymeric industrial electrical machines. Other embodiments include apparatuses, systems, devices, hardware, methods, and combinations for polymeric industrial electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
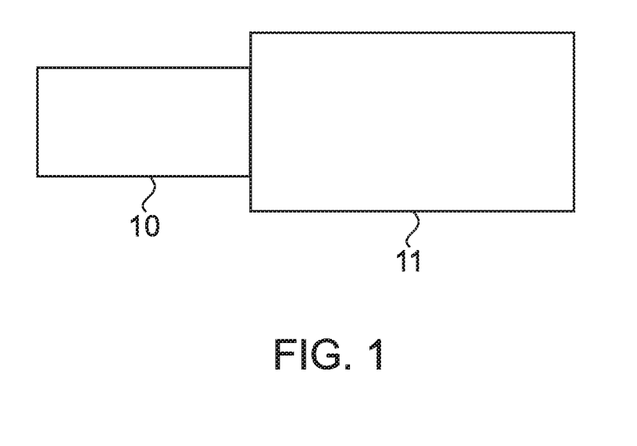
FIG. 1 schematically illustrates some aspects of a non-limiting example of an electrical machine coupled to driven equipment in accordance with an embodiment of the present invention.
Figure 2:
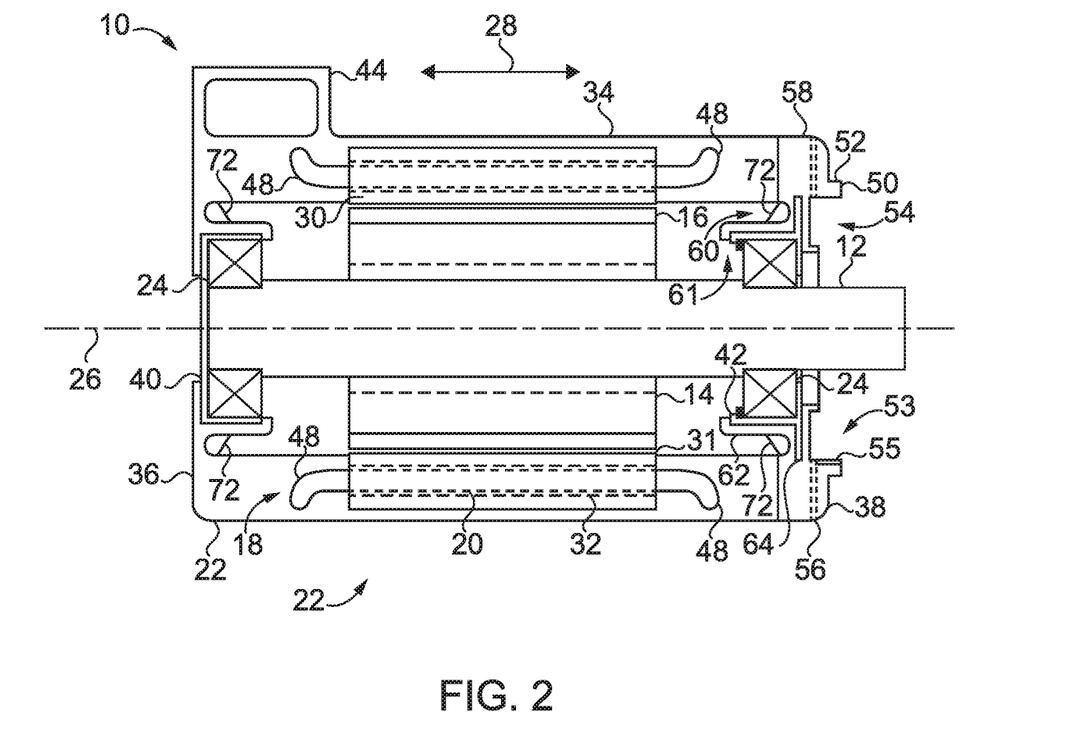
FIG. 2 schematically illustrates some aspects of a non-limiting example of an electrical machine in accordance with an embodiment of the present invention.
Figure 3:
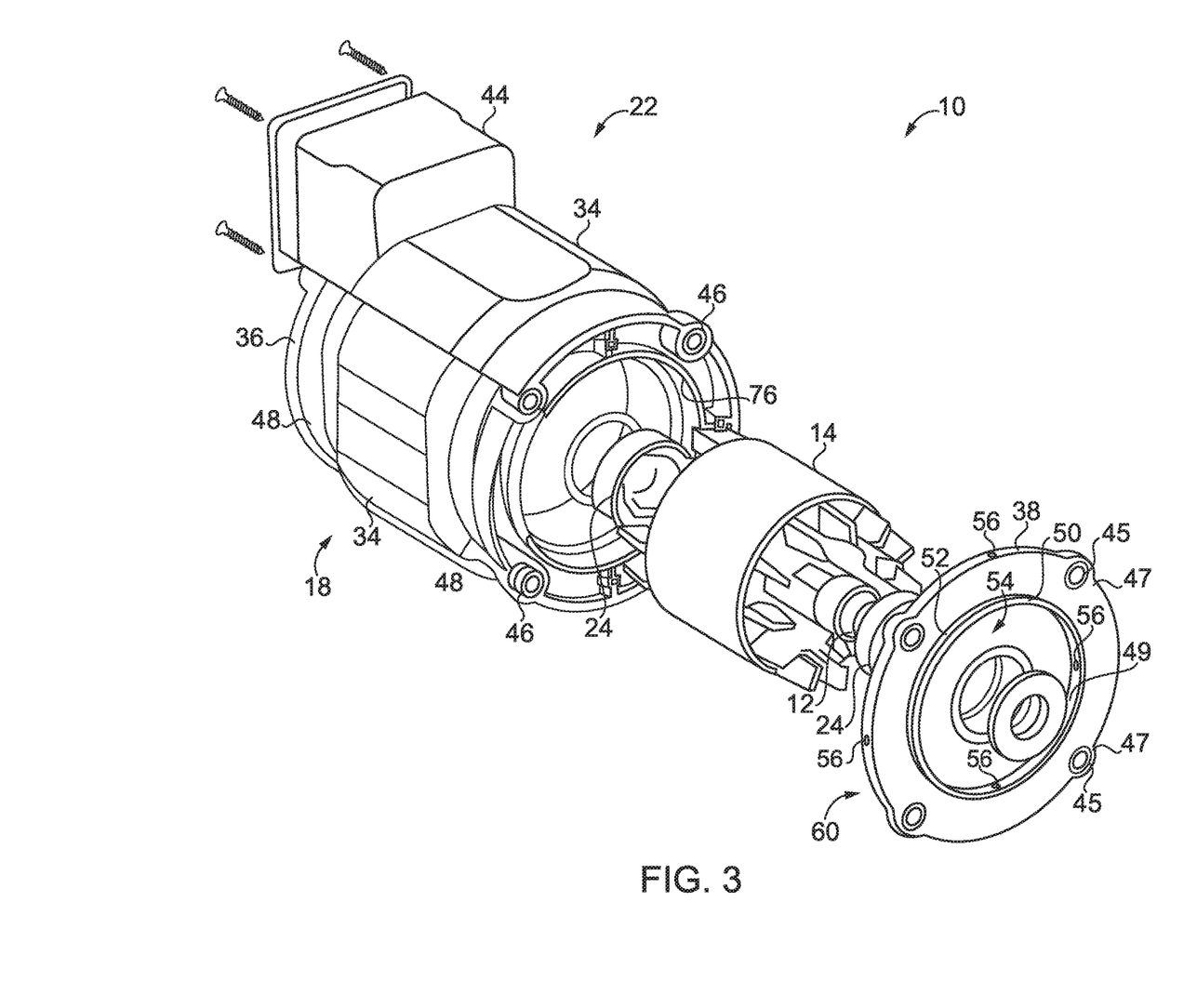
FIG. 3 illustrates a partial cutaway exploded perspective view of some aspects of a non-limiting example of an electrical machine in accordance with an embodiment of the present invention.
Figure 4A:
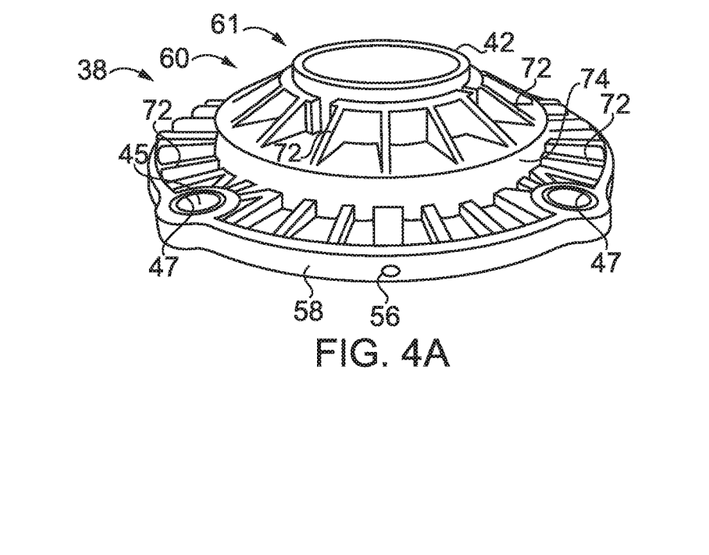
FIG. 4A-4D are respective interior perspective, exterior end, bottom perspective and interior end views illustrating aspects of a non-limiting example of a drive end endplate for an electrical machine in accordance with an embodiment of the present invention.
Figure 4B:
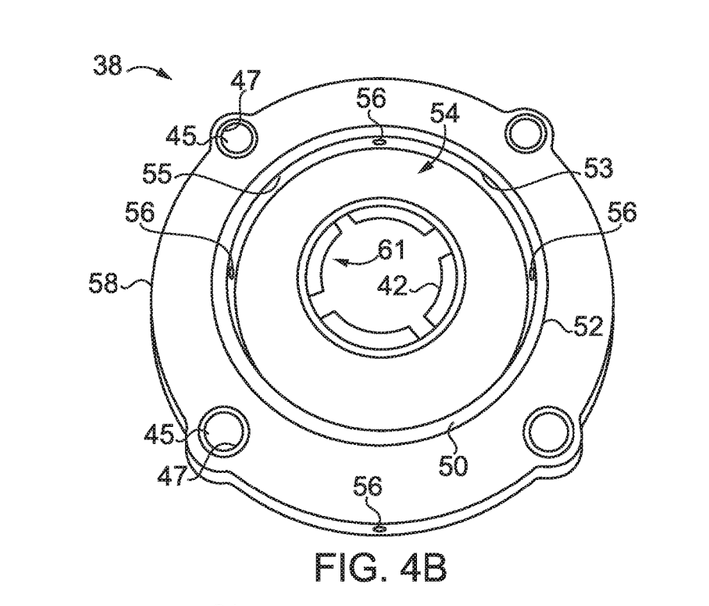
Figure 4C:
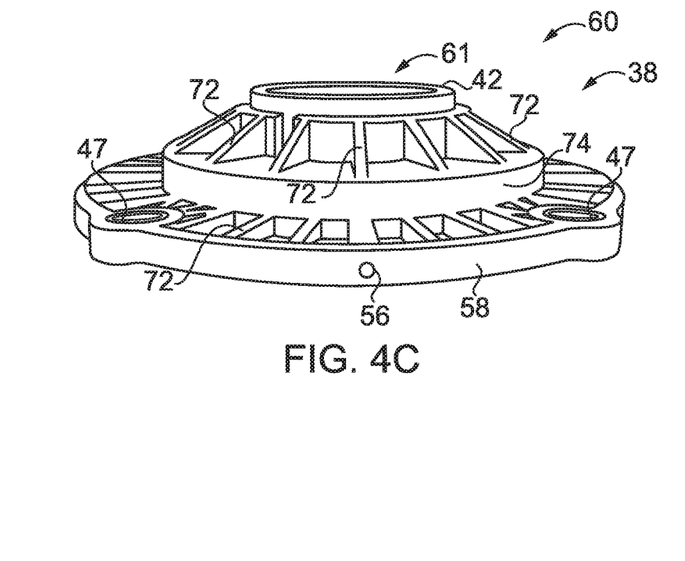
Figure 4D:
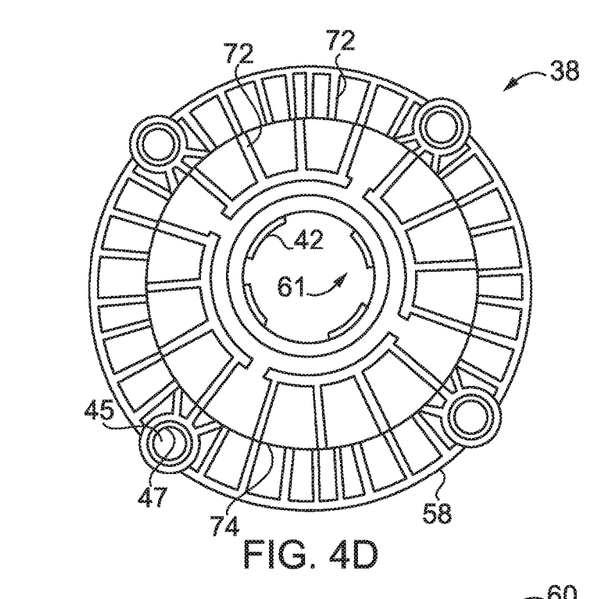
Figure 5:
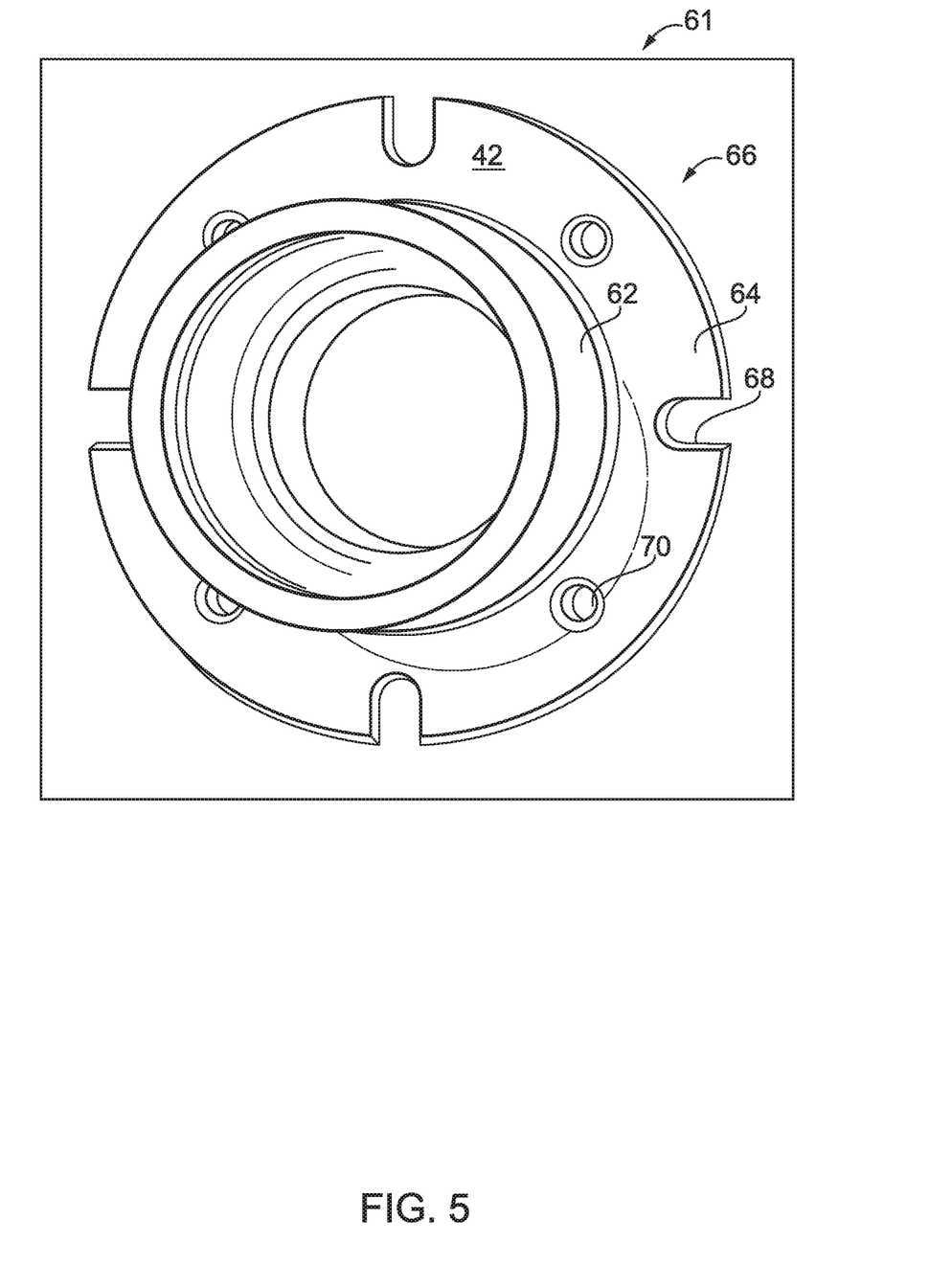
FIG. 5 illustrates some aspects of a non-limiting example of a metallic structure in the form of a bearing sleeve constructed to enhance the mechanical strength and stiffness of a drive end endplate in accordance with an embodiment of the present invention.

Referring to the drawings, and in particular FIGS. 1-3, some aspects of a non-limiting example of an electrical machine 10 in accordance with an embodiment of the present invention are schematically depicted. In one form, electrical machine 10 is a permanent magnet motor. In other embodiments, electrical machine 10 may be a motor and/or a generator. Electrical machine 10 may be any type of electrical machine, such as a switched reluctance motor, synchronous reluctance motor, permanent magnet assisted reluctance motor, a permanent magnet motor, an induction motor or any other type of motor, generator or motor/generator. In various embodiments, electrical machine 10 may be a radial flux machine, an axial flux machine or a machine having a three-dimensional (3D) flux path. Electrical machine 10 is constructed to mount to and drive driven equipment 11, e.g., a pump, a gearbox or another device or system.

In one form, electrical machine 10 is an industrial electrical machine, e.g., an industrial motor. In other embodiments, electrical machine 10 may not be an industrial electrical machine. In one form, electrical machine 10 is an industrial totally enclosed—not ventilated (TENV) machine. In some embodiments, electrical machine 10 may be an industrial totally enclosed water cooled (TEWC) machine. In a particular form, electrical machine 10 is an industrial washdown machine constructed for use in the food and beverage industry, and subject to being washed down with water, detergents, solvents, e.g., organic solvents, and other fluids, at least some of which may be or contain corrosive fluids and/or volatiles. In other embodiments, electrical machine 10 may be another type of industrial electrical machine. An industrial electrical machine is an electrical machine that is fixed in place or on a movable structure, not handheld, and is used in industry for one or more of various industrial or other purposes, e.g., in industrial processes, in the fabrication of industrial or consumer chemicals, materials and goods, the provision of consumer and industrial services, manufacturing facilities, municipalities, material handling and other industry, and is not an electrical machine used in consumer products, such as tools used around the home and in home or home-like workshops, such as handheld or fixed electric drills, electric screwdrivers, electric saws and the like used in home and home-like workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to or capable of being subject to without excessive damage.

Unlike industrial electrical machines, the power requirements for electrical machines used in consumer items is relatively low, and continuous service is not required, and thus, the mechanical strength and thermal dissipation requirements of such consumer electrical machines are low, unlike industrial electrical machines, which often operate continuously and at higher power output than electrical machines for consumer items. Industrial electrical machines thus have higher mechanical strength and thermal dissipation requirements, rendering consumer item electrical machines and their housings and components unsuitable for use in industrial electrical machines. An industrial electrical machine as that term is used herein includes electrical machines with power ratings up to about 5 hp, in some embodiments, and power ratings up to or in excess of about 25 hp in other embodiments. Electrical machine 10 includes a shaft 12, a rotor 14 having poles 16, a stator 18 including stator windings 20, a polymeric housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit rotating mechanical shaft power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28. Shaft 12 is coupled to driven equipment 11, and is constructed to supply rotating shaft power to driven equipment 11.

Rotor 14 and stator 18 are in magnetic communication with each other. Each of rotor 14/poles 16 and stator 18 have a construction that is operative to direct magnetic flux toward and from each other for converting between electrical power and mechanical power. In various embodiments, rotor 14 includes operative sources of magnetic flux, e.g., bus bars, a squirrel cage, windings, and/or permanent magnets.

Polymeric housing 22 is constructed to house components of electrical machine 10, e.g., stator 18, rotor 14, most of shaft 12 and bearings 24. Polymeric housing 22 is constructed to structurally support electrical machine 10 and react torque loads generated by the electrical machine 10. In one form, polymeric housing 22 is the external housing of electrical machine 10, separating the internal components of electrical machine 10 from the environment in which electrical machine 10 is installed. In other embodiments, polymeric housing 22 may be an intermediate housing, e.g., disposed within a housing structure that separates electrical machine 10 from the environment in which it is installed. In still other embodiments, polymeric housing 22 may define both an external and an intermediate or internal housing.

Polymeric housing 22 is made of or formed by a polymeric material or in some embodiments, a composite material. In a more particular form, polymeric housing 22 is made of a thermoplastic. In other embodiments, polymeric housing 22 may also or alternatively be formed of one or more other polymeric materials. In some embodiments, the polymeric material use to form polymeric housing 22 is constructed and configured to provide chemical resistance to a wide range of chemicals and/or to particular chemicals for selected applications, including strong mechanical performance, and thermal and chemical or environmental stability. In some embodiments, the polymeric material is particularly constructed and configured to withstand the fluids used in industrial washdown chemicals and procedures without deleterious effect. Examples of materials that may be used to form polymeric housing 22 include one or more polymer materials, or polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyde (PF), unsatured polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

Stator 18 includes a laminated stator core 30. Stator windings 20 are disposed within passages 32 in laminated stator core 30. In one form, stator windings 20 are copper conductors. In other embodiments, aluminum and/or other conductor materials may be employed in addition to or in place of copper. Stator windings 20 are constructed for magnetic communication with poles 16. Stator 18 is overmolded into and partially encapsulated by polymeric housing 22, e.g., by a central portion of polymeric housing 22, referred to as stator band 34. Stator band 34 is constructed to house stator 18, including laminated stator core 30 and stator windings 20 (including winding overhangs, described below). The term, "overmolded" as used herein refers to a characteristic structural form wherein the components are said to be overmolded if one of the components is a molded component, formed by molding, e.g., the polymeric material forming polymeric housing 22, and is molded to encapsulate another of the components to a degree that certain geometric features of the other component are encapsulated by or contained wholly or partially within or constrained by certain geometric features of the molded component, such that the components are locked to each other and cannot be removed from each other without fracturing or damaging one or more of the components. Overmolding may be achieved by, for example, injection molding, compression molding, transfer molding or other molding processes, and in some embodiments, by potting. In the illustrated embodiment, laminated stator core 30 is overmolded into polymeric housing 22, e.g., into stator band 34, and partially encapsulated by polymeric housing 22 within the polymeric material forming polymeric housing 22.

In one form, polymeric housing 22 is a unitary nonmetallic housing having an integral endplate 36 disposed at one end of stator band 34, i.e., integral with stator band 34. In some embodiments, housing 22 may be metallic or partially metallic. In some embodiments, endplate 36 may not be integral, but rather, may be attached or affixed to stator band 34. A second endplate 38 is attached to housing 22 at the opposite end of stator band 34. In one form, endplate 36 is a non-drive end endplate, and endplate 38 is a drive-end endplate, e.g., a pulley endplate. In some embodiments, endplate 36 may be a drive-end endplate integral with stator band 34, and endplate 38 may be a non-drive end endplate. In some embodiments, endplate 36 may be convex, e.g., conical, in order to aid in shedding fluids during and after washdown. In some embodiments, housing 22 also includes an integral conduit box 44. In other embodiments, conduit box 44 may be attached, e.g., may be glued or welded or otherwise affixed or attached to stator band 34 and/or endplate 36 and/or endplate 38. Still other embodiments may not include a conduit box. In one form, drive end endplate 38 is a polymeric drive end endplate, e.g., formed of a polymeric material, such as one or more polymeric materials described above with respect to polymeric housing 22. The illustrated embodiment is constructed for face-mounting via drive end endplate 38, although in other embodiments, housing 22 may include a foot or feet for foot-mounting.

Overmolded with endplates 36 and 38 are respective sleeves 40 and 42. In one form, sleeves 40 and 42 are bearing support sleeves. In one form, one or both of sleeves 40 and 42 are metallic. In some embodiments, one or both of sleeves 40 and 40 may be made of another material, e.g., a fiber-reinforced thermoset or another material. In one form, sleeves 40 and 42 are constructed to increase the stiffness of respective endplates 36 and 38, e.g., by virtue of having cylindrical portions with flanges, the diameter and thickness of each of which is configured to increase the stiffness of respective endplates 36 and 38. In addition, the axial length and/or other features of sleeves 40 and 42 may be configured to add stiffness to respective endplates 36 and 38. In other embodiments, sleeves 40 and/or 42 may not be constructed to increase the stiffness of the respective endplates. In some embodiments, sleeves 40 and/or 42 may be formed of the same material as respective endplates 36 and/or 38, and may be formed as part of the respective endplates 36 and/or 38. In other embodiments, one or both of sleeves 40 and 42 may be nonmetallic, and may be any suitable material. In one form, respective bearings 24 are mounted in bearing sleeves 40 and 42, which are operative to pilot the respective bearings 24. In other embodiments, sleeves 40 and 42 may form parts of the corresponding bearings 24, e.g., may be outer races or journals. Sleeves 40 and 42 may be overmolded with respective endplates 36 and 38 by forming retaining features on the sleeves, inserting the sleeves in a mold, and injecting the polymeric material forming endplates 36 and 38 into the mold in an injection molding process to form the endplates, such that the endplate polymeric material flows around and encapsulates retaining features of the sleeve during the molding process, e.g., load-bearing features and/or other retention features.

Bearings 24 are constructed to react shaft 12 and rotor 14 axial or thrust loads in direction 28, and to react shaft 12 and rotor 14 radial loads perpendicular to axis of rotation 26. Polymeric housing 22 is constructed to enclose stator 18 and react loads associated with stator 18, e.g., torque loads and any other loads generated due to magnetic interaction between stator 18 and rotor 14 during the operation of electrical machine 10. Polymeric housing 22 is also constructed to react thrust loads delivered through bearings 24.

Stator band 34 is in self-locked engagement with laminated stator core 30. By "self-locked engagement," it is meant that the components so described are locked together absent the use of separate or other intermediate components to attain the condition of being locked together, e.g., absent the use of screws, bolts, retaining rings, clamps, or the like, and are not free to displace in any direction relative to each other, other than by such phenomena as mechanical stress/strain and/or relative thermal expansion or contraction, and in some situations, hygroscopic expansion and/or contraction. Self-locked engagement may be achieved in various manners. For example, self-locked engagement may be achieved where two or more components are overmolded together, or by employing an interference or press fit between two or more components to achieve self-locked engagement of the components. Laminated stator core 30 and stator windings 20 are overmolded with stator band 34 of polymeric housing 22, e.g., using an injection molding process. In some such embodiments, winding leads from stator windings 20 may be over-molded with stator band 34 and/or integral endplate 36 and/or conduit box 44. Stator band 34 includes a plurality of threaded inserts 46 overmolded therein. Threaded inserts 46 are constructed to react electrical machine 10 mounting loads and torque loads. In some embodiments, threaded inserts 46 extend beyond stator band 34 and into drive end endplate 38. Drive end endplate 38 includes a corresponding plurality of openings 45 constructed to receive threaded inserts 46 thereinto. In some embodiments, openings 45 may include metallic anti-creep spacers 47 disposed therein and constructed to absorb axial loads and prevent or reduce creep, e.g., enlargement, of openings 45 or to prevent or reduce cracking of openings 45. In some embodiments, a washer seal 49, e.g., a plastic washer seal, may be mounted on shaft 12 and rotate with shaft 22 to reduce or eliminate fluid ingress across shaft 12 into electrical machine 10 during washdown. Bolts (not shown) may engage threaded inserts 46 through openings 45 (and anti-creep spacers in embodiments so equipped) to secure drive end endplate 38 to polymeric housing 22 and/or to secure polymeric housing 22 and electrical machine 10 to driven equipment 11.

Stator windings 20 include a winding overhang 48 on each side of laminated stator core 30. Winding overhangs 48 extends axially from laminated stator core 30, e.g., axially outward or away from laminated stator core 30. Winding overhangs 48 are overmolded into stator band 34 of polymeric housing 22.

In some embodiments, housing 22 may be or may not be overmolded over the whole of the metallic parts. In other embodiments, part of the metallic components, e.g., plural winding laminations, may be exposed without polymeric stator band or housing band coverage or overmolding. Other areas of the metallic components may be still overmolded with the polymeric or nonmetallic housing.

Referring also to FIGS. 4A-4D and 5, drive end endplate 38 is constructed to mount electrical machine 10, e.g., onto driven equipment 11 (FIG. 1). Drive end endplate 38 includes a polymeric stiffening structure 60 and a metallic structure 61 overmolded into drive end endplate 38 and constructed to enhance the mechanical strength and stiffness of drive end endplate 38. In one form, the metallic structure 61 is bearing sleeve 42. Bearing sleeve 42 includes a cylindrical portion 62 and a flange 64 constructed to enhance the mechanical stiffness and strength of drive end endplate 38. Flange 64 includes openings 66, e.g., in the form of slots 68 and holes 70 constructed to receive the polymeric material forming polymeric drive end endplate 38 during overmolding, which aid in locking bearing sleeve 42 in drive end endplate 38, and increase the strength and rigidity of the overmolded and locked engagement of bearing sleeve 42 with drive end endplate 38. Cylindrical portion 62 is also constructed to receive bearing 24.

Polymeric stiffening structure 60 includes polymeric ribs 72 constructed to stiffen drive end endplate 38, enhance the mechanical strength of drive end endplate 38 and in some embodiments to react electrical machine 10 overhang loads. In the inner portion of drive end endplate 38, the ribs 72 are conical, although other shapes may be employed in other embodiments. In some embodiments, integral non-drive end endplate 36 may also include polymeric ribs 72 constructed to stiffen integral non-drive end endplate 36 and enhance the mechanical strength of non-drive end endplate 36 Drive end endplate 38 also includes a pilot diameter 74 constructed to radially position drive end endplate 38 with electrical machine 10 by piloting drive end endplate 38 against a mating pilot diameter 76 (FIG. 3) in housing 22, e.g., in stator band 34, adjacent to stator 30.

Drive end endplate 38 includes a rabbet 50. Rabbet 50 is constructed to interface with driven equipment 11. Rabbet 50 is constructed to radially position drive end endplate 38 relative to driven equipment 11, e.g., by piloting driven equipment 11 on an outside diameter 52 of rabbet 50. Some embodiments may employ an inside diameter 53, e.g., on rabbet 50, to pilot and position driven equipment 11. In some embodiments, inside diameter 53 may include crushable ribs 55, which in some embodiments may be formed as a straight or a helical knurl, to pilot, position and align electrical machine 10 with driven equipment 11. Drive end endplate 38 includes a cavity 54 formed therein, e.g., disposed radially inward of rabbet 50, and a plurality of drain holes 56 open to cavity 54. Drain holes 56 are constructed to drain cavity 54 through drive end endplate 38, e.g., to an outer diameter 58 of drive end endplate 38, for example, to drain any fluid seepage entering cavity 54 from the interface between drive end endplate 38 and driven equipment 11 during washdown.

Figure 6:
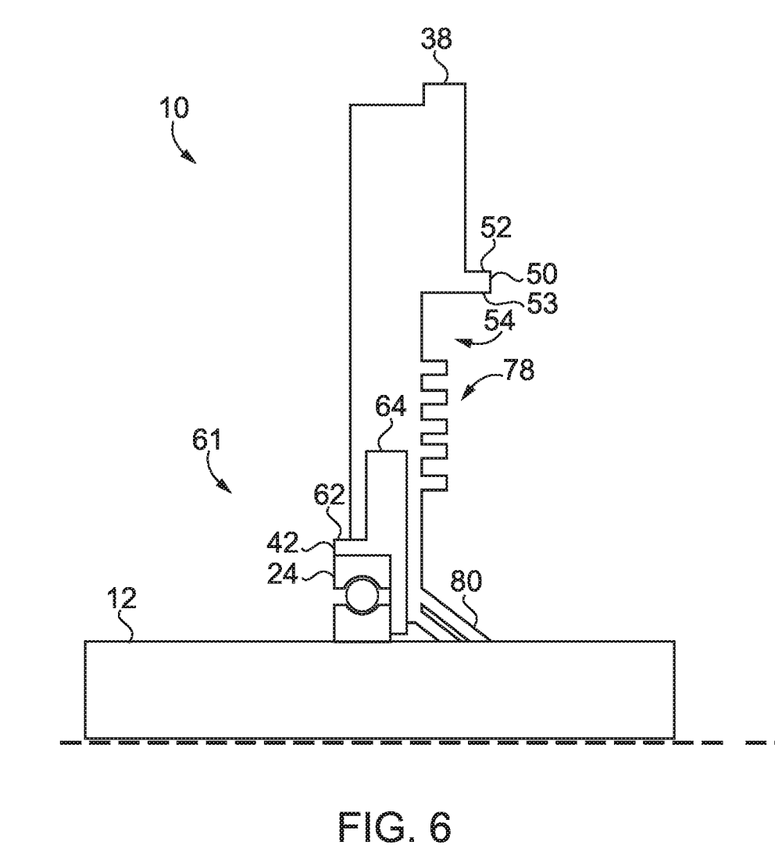
FIG. 6 schematically illustrates some aspects of a non-limiting example of a drive end endplate for an electrical machine in accordance with an embodiment of the present invention.

Referring also to FIG. 6, in some embodiments, drive end endplate 38 includes a polymeric labyrinth seal 78 constructed to seal against driven equipment 11 (FIG. 1) and discourage the ingress of fluids into the interface between drive end endplate 38 and driven equipment 11, e.g., during washdown. In some embodiments, drive end endplate 38 may include a molded polymeric shaft seal 80 constructed to extend to and seal shaft 12, and in some embodiments contact and seal against shaft 12. In some embodiments, molded polymeric shaft seal 80 is conical in shape. In some embodiments, molded polymeric shaft seal 80 is in the form of a labyrinth seal.

Figure 7:
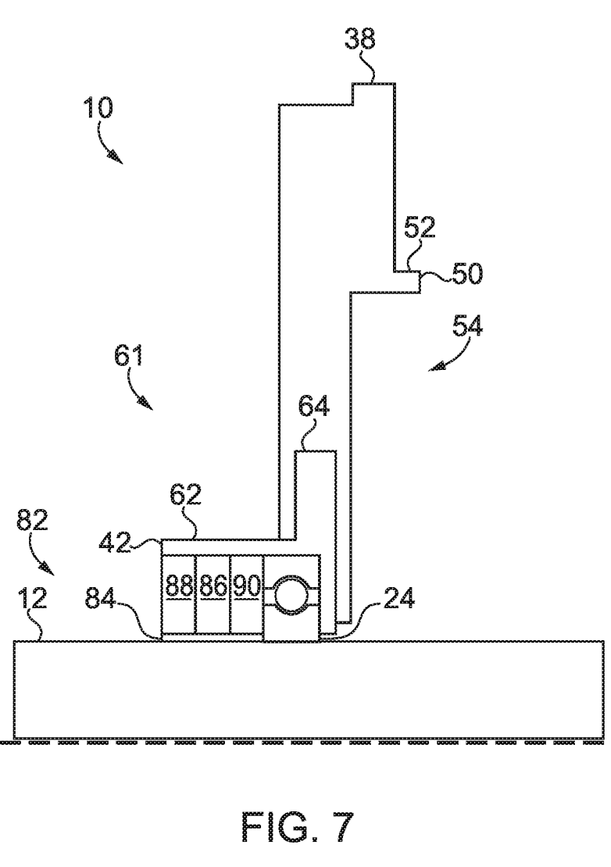
FIG. 7 schematically illustrates some aspects of a non-limiting example of a drive end endplate for an electrical machine in accordance with an embodiment of the present invention.

Referring also to FIG. 7, in some embodiments, electrical machine 10 may include a ferrofluidic seal 82 constructed to seal between drive end endplate 38, e.g., metallic structure 61, and shaft 12. In one example, ferrofluidic seal 82 is housed in cylindrical portion 62 of bearing sleeve 42, and seals between cylindrical portion 62 and shaft 12. In other embodiments, ferrofluidic seal may be disposed in other locations. Ferrofluidic seal 82 may include, for example, a ferrofluid film 84 disposed or suspended between shaft 14 and one or more discs forms formed of a magnetic material and piloted by cylindrical portion 62, e.g., a hard magnetic material disc 86 axially sandwiched between soft magnetic material discs 88 and 90. In other embodiments, ferrofluidic seal 82 may take other forms or may be of other configurations.

Figure 8:
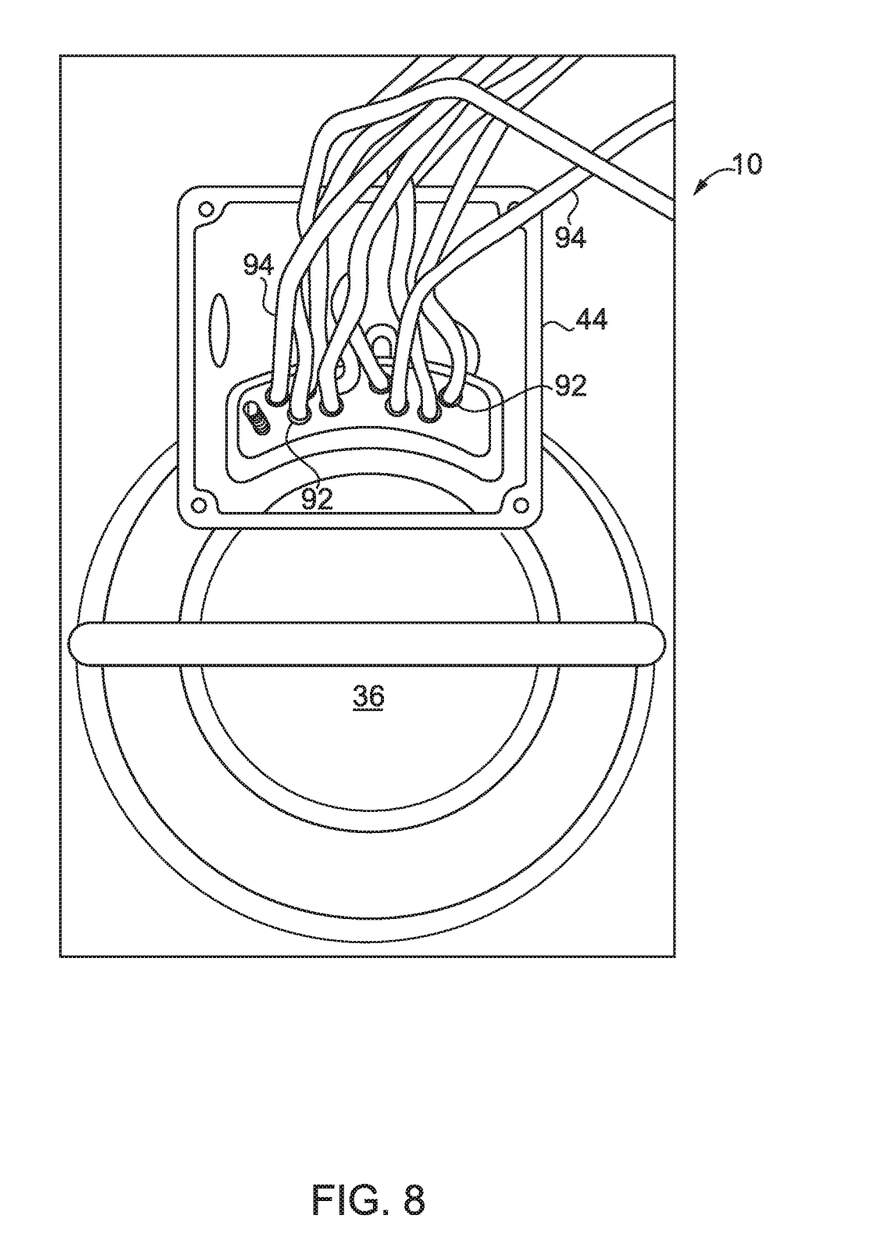
FIG. 8 schematically illustrates some aspects of a non-limiting example of an electrical machine in accordance with an embodiment of the present invention.

Referring also to FIG. 8, electrical machine 10 includes a plurality of through-hole inserts 92 disposed in polymeric housing 22, e.g., in conduit box 44. A plurality of electrical leads 94 are disposed in and extend through through-hole inserts 92 from the interior of electrical machine 10. The electrical leads 94 may be, for example, winding leads for stator windings 20, sensor leads or other electrical leads.

Embodiments of the present invention include an electrical machine, comprising: a polymeric housing having a stator band, the polymeric housing formed by a polymeric material and constructed to house components of the electrical machine, structurally support the electrical machine and react torque loads generated by the electrical machine; a stator overmolded into and partially encapsulated by the stator band, the stator including a laminated stator core and a plurality of stator windings (in some embodiments, the stator core may be exposed, without being fully covered or overmolded by the stator band or housing band); a rotor in magnetic communication with the stator; a non-drive end endplate integral with the polymeric housing; and a polymeric drive end endplate constructed to mount the electrical machine, the drive end endplate including a plurality of ribs and a metallic structure, the ribs being constructed to react electrical machine overhang loads, and the metallic structure being overmolded into the drive end endplate and constructed to enhance mechanical strength of the drive end endplate, wherein the electrical machine is constructed as an industrial electrical machine.

Embodiments of the present invention include an electrical machine, comprising: a polymeric housing having a stator band, the polymeric housing formed by a polymeric material and constructed to house components of the electrical machine, structurally support the electrical machine and react torque loads generated by the electrical machine; a stator overmolded into and partially encapsulated by the stator band, the stator including a laminated stator core and a plurality of stator windings; a rotor in magnetic communication with the stator; a first endplate integral with the polymeric housing; and a second endplate, the second endplate being a polymeric endplate, the second endplate including a plurality of ribs and a metallic structure, wherein the electrical machine is constructed as an industrial electrical machine.

In a refinement, the first endplate is a non-drive end endplate and the second endplate is a drive end endplate.

In another refinement, the drive end endplate is constructed to mount the electrical machine.

In yet another refinement, the ribs are constructed to react electrical machine overhang loads, and the metallic structure is overmolded into the drive end endplate and constructed to enhance mechanical stiffness of the drive end endplate In still another refinement, the metallic structure includes a cylindrical portion constructed to receive a bearing and a flange having openings therein constructed to receive the polymeric material forming the polymeric drive end endplate.

In yet still another refinement, the electrical machine is constructed to mount to and drive driven equipment, wherein the polymeric drive end endplate includes a rabbet constructed to radially position the drive end endplate relative to the driven equipment, a cavity disposed radially inward of the rabbet, and a drain hole open to the cavity and constructed to drain the cavity.

In a further refinement, the stator band includes a plurality of threaded inserts overmolded therein and constructed to react electrical machine mounting loads.

In a yet further refinement, the drive end endplate includes a plurality of openings constructed to receive the threaded inserts, wherein the threaded inserts extend into the plurality of openings.

In a still further refinement, the electrical machine is constructed to mount to and drive driven equipment, wherein the drive end endplate includes a labyrinth seal constructed to seal against the driven equipment.

In a yet still further refinement, the rotor includes a shaft, further comprising a ferrofluidic seal constructed to seal between the metallic structure and the shaft.

In another further refinement, the electrical machine is constructed as an industrial washdown electrical machine.

In yet another further refinement, the electrical machine further comprises a plurality of through-hole inserts disposed in the housing, and plurality of electrical leads disposed in and extending through corresponding through-hole inserts.

In still another further refinement, the electrical machine is constructed to mount to and drive driven equipment, further comprising crushable ribs configured to align the electrical machine with the driven equipment.

Embodiments of the present invention include an electrical machine, comprising: a polymeric housing having an integral stator band and an integral non-drive end endplate; a stator overmolded into and partially encapsulated by the stator band, the stator including a laminated stator core and a plurality of stator windings, the stator windings including a winding overhang extending from the laminated stator core, wherein the winding overhang is overmolded into and encapsulated by the polymeric housing; a rotor in magnetic communication with the stator; a non-drive end endplate integral with the polymeric housing; and a polymeric drive end endplate constructed to mount the electrical machine, the drive end endplate including a polymeric stiffening structure and a bearing support structure, the polymeric stiffening structure being constructed to react electrical machine overhang loads, and the bearing support structure being overmolded into the drive end endplate and constructed to enhance mechanical stiffness of the drive end endplate, wherein the electrical machine is constructed as an industrial electrical machine.

In a refinement, the bearing support structure is a metallic structure, and the metallic structure includes a cylindrical portion constructed to receive a bearing and a flange having openings therein constructed to receive the polymeric material forming the polymeric drive end endplate.

In another refinement, the electrical machine is constructed to mount to and drive driven equipment, wherein the polymeric drive end endplate includes a rabbet constructed to radially position the drive end endplate relative to the driven equipment, a cavity disposed radially inward of the rabbet, and a drain hole open to the cavity and operative to drain the cavity.

In yet another refinement, the stator band includes a plurality of threaded inserts overmolded therein and constructed to react electrical machine mounting loads.

In still another refinement, the drive end endplate includes a plurality of openings constructed to receive the threaded inserts, wherein the threaded inserts extend into the plurality of openings.

In yet still another refinement, the electrical machine is constructed to mount to and drive driven equipment, wherein the drive end endplate includes a molded polymeric shaft seal constructed to seal against the shaft.

In a further refinement, the rotor includes a shaft, further comprising a ferrofluidic seal constructed to between the bearing support structure and the shaft.

In a yet further refinement, the non-drive end includes a plurality of ribs constructed to stiffen the non-drive end endplate.

In a still further refinement, the electrical machine further comprises a plurality of through-hole inserts disposed in the housing, and plurality of electrical leads disposed in and extending through corresponding through-hole inserts.

In a yet still further refinement, the electrical machine being constructed to mount to and drive driven equipment, wherein the drive end endplate includes a labyrinth seal constructed to seal against the driven equipment.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical machine, comprising:
   a polymeric housing having a stator band, the polymeric housing formed by a polymeric material and constructed to house components of the electrical machine, structurally support the electrical machine and react torque loads generated by the electrical machine;
   a stator overmolded into and partially encapsulated by the stator band, the stator including a laminated stator core and a plurality of stator windings;
   a rotor in magnetic communication with the stator;
   a first endplate integral with the polymeric housing; and
   a second endplate, the second endplate being a polymeric endplate, the second endplate including a plurality of ribs and a metallic structure,
   wherein the electrical machine is constructed as an industrial electrical machine,
   wherein the first endplate is a non-drive end endplate and the second endplate is a drive end endplate, and
   wherein the electrical machine being constructed to mount to and drive driven equipment, wherein the polymeric drive end endplate includes a rabbet constructed to radially position the drive end endplate relative to the driven equipment, a cavity disposed radially inward of the rabbet, and a drain hole open to the cavity and constructed to drain the cavity.

2. The electrical machine of claim 1, wherein the drive end endplate is constructed to mount the electrical machine.

3. The electrical machine of claim 2, the ribs being constructed to react electrical machine overhang loads, and the metallic structure being overmolded into the drive end endplate and constructed to enhance mechanical stiffness of the drive end endplate.

4. The electrical machine of claim 3, wherein the metallic structure includes a cylindrical portion constructed to receive a bearing and a flange having openings therein constructed to receive the polymeric material forming the polymeric drive end endplate.

5. The electrical machine of claim 3, wherein the stator band includes a plurality of threaded inserts overmolded therein and constructed to react electrical machine mounting loads.

6. The electrical machine of claim 5, wherein the drive end endplate includes a plurality of openings constructed to receive the threaded inserts, wherein the threaded inserts extend into the plurality of openings.

7. The electrical machine of claim 3, the electrical machine being constructed to mount to and drive driven equipment, wherein the drive end endplate includes a labyrinth seal constructed to seal against the driven equipment.

8. The electrical machine of claim 3, wherein the rotor includes a shaft, further comprising a ferrofluidic seal constructed to seal between the metallic structure and the shaft.

9. The electrical machine of claim 3, wherein the electrical machine is constructed as an industrial washdown electrical machine.

10. The electrical machine of claim 3, further comprising a plurality of through-hole inserts disposed in the housing, and plurality of electrical leads disposed in and extending through corresponding through-hole inserts.

11. The electrical machine of claim 3, the electrical machine being constructed to mount to and drive driven equipment, further comprising crushable ribs configured to align the electrical machine with the driven equipment.

12. An electrical machine, comprising:
a polymeric housing having an integral stator band and an integral non-drive end endplate;
a stator overmolded into and partially encapsulated by the stator band, the stator including a laminated stator core and a plurality of stator windings, the stator windings including a winding overhang extending from the laminated stator core, wherein the winding overhang is overmolded into and encapsulated by the polymeric housing;
a rotor in magnetic communication with the stator; and
a polymeric drive end endplate constructed to mount the electrical machine, the drive end endplate including a polymeric stiffening structure and a bearing support structure, the polymeric stiffening structure being constructed to react electrical machine overhang loads, and the bearing support structure being overmolded into the drive end endplate and constructed to enhance mechanical stiffness of the drive end endplate,
wherein the electrical machine is constructed as an industrial electrical machine, and
wherein the electrical machine being constructed to mount to and drive driven equipment, wherein the polymeric drive end endplate includes a rabbet constructed to radially position the drive end endplate relative to the driven equipment, a cavity disposed radially inward of the rabbet, and a drain hole open to the cavity and operative to drain the cavity.

13. The electrical machine of claim 12, wherein the bearing support structure is a metallic structure, and wherein the metallic structure includes a cylindrical portion constructed to receive a bearing and a flange having openings therein constructed to receive the polymeric material forming the polymeric drive end endplate.

14. The electrical machine of claim 12, wherein the stator band includes a plurality of threaded inserts overmolded therein and constructed to react electrical machine mounting loads.

15. The electrical machine of claim 14, wherein the drive end endplate includes a plurality of openings constructed to receive the threaded inserts, wherein the threaded inserts extend into the plurality of openings.

16. The electrical machine of claim 12, the electrical machine being constructed to mount to and drive driven equipment, wherein the drive end endplate includes a molded polymeric shaft seal constructed to seal against the shaft.

17. The electrical machine of claim 12, wherein the rotor includes a shaft, further comprising a ferrofluidic seal constructed to seal between the bearing support structure and the shaft.

18. The electrical machine of claim 12, wherein the non-drive end endplate includes a plurality of ribs constructed to stiffen the C endplate.

19. The electrical machine of claim 12, further comprising a plurality of through-hole inserts disposed in the housing, and plurality of electrical leads disposed in and extending through corresponding through-hole inserts.

20. The electrical machine of claim 12, the electrical machine being constructed to mount to and drive driven equipment, wherein the drive end endplate includes a labyrinth seal constructed to seal against the driven equipment.

* * * * *